Patented June 27, 1944

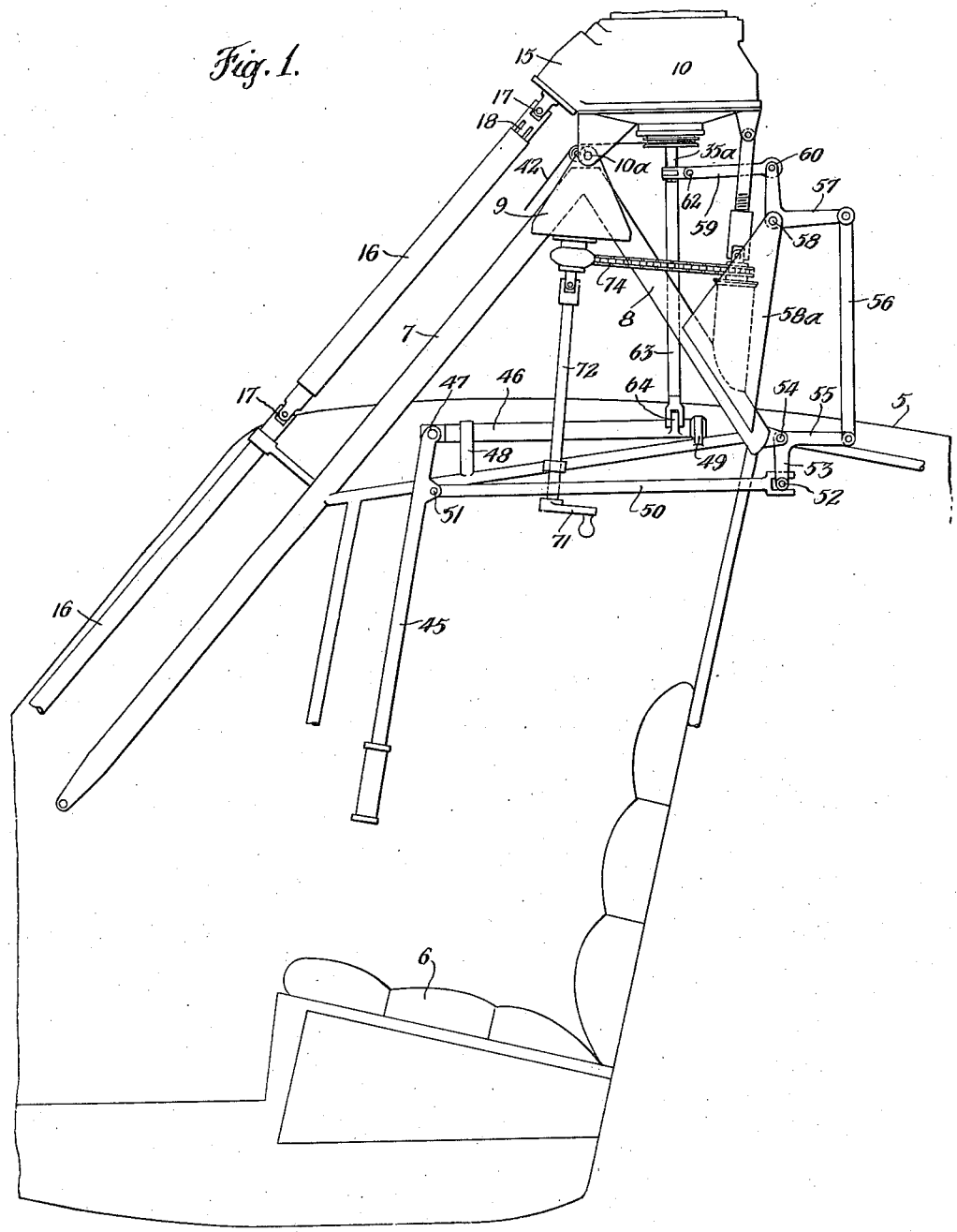

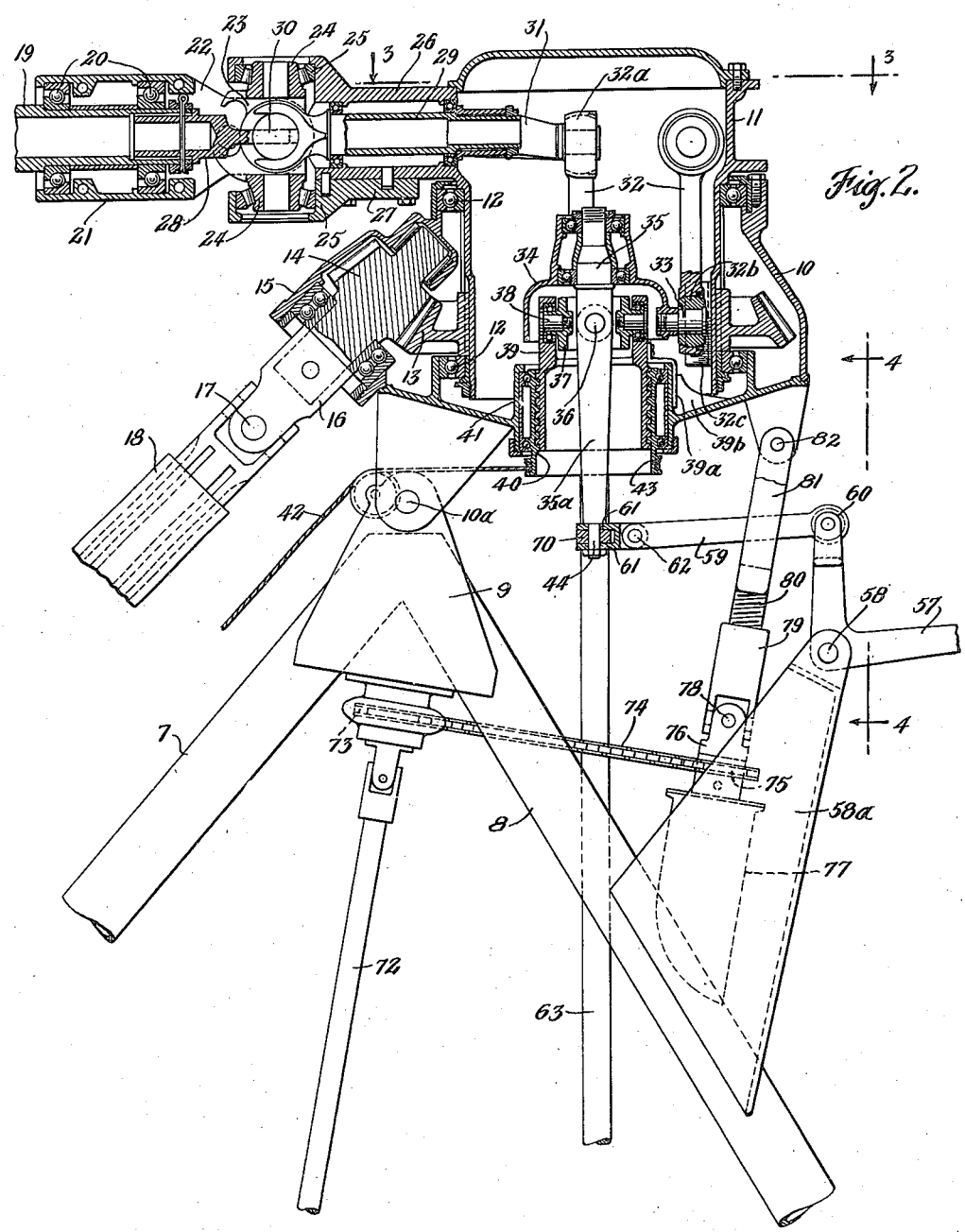

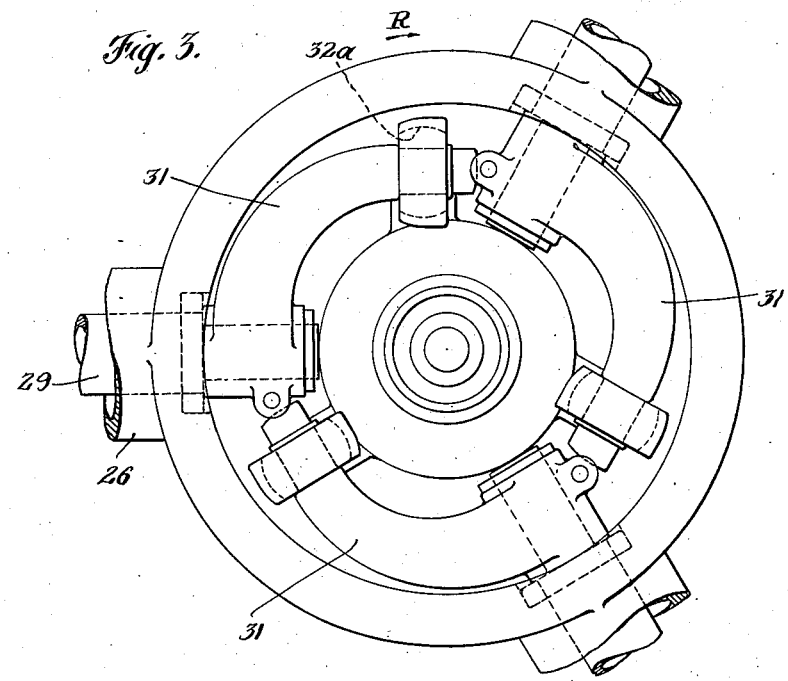
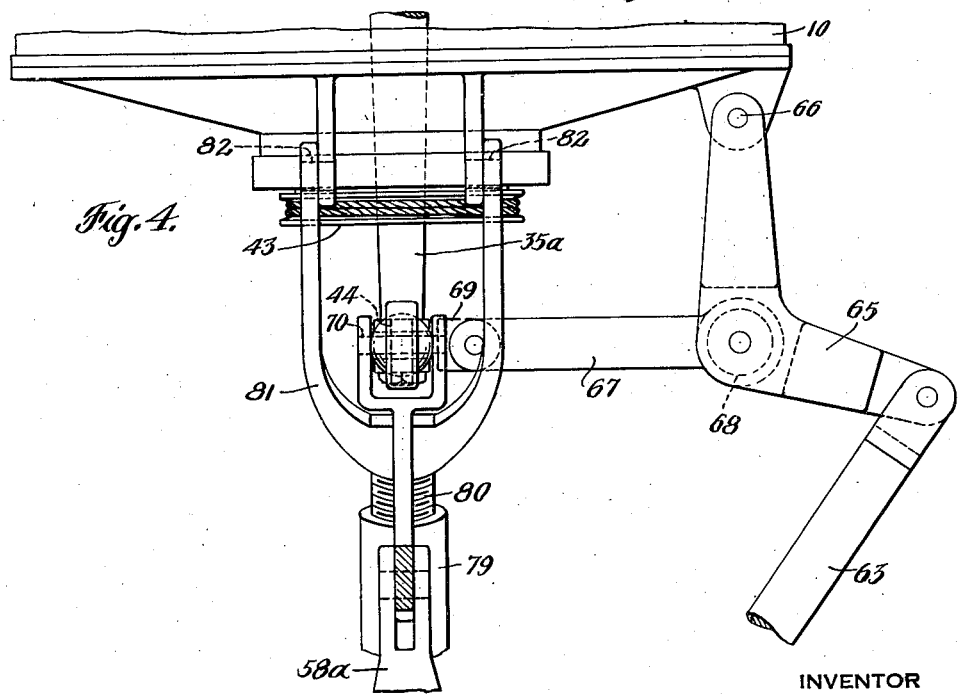

2,352,342

UNITED STATES PATENT OFFICE 2,352,342

AIRCRAFT EQUIPPED WITH SUSTAINING ROTORS

Harold F. Pitcairn, Bryn Athyn, Pa., assignor to Autogiro Company of America, Willow Grove, Pa., a corporation of Delaware Substituted for abandoned application Serial No. 349,049, August 1, 1940. This application November 2, 1940, Serial No. 363,997

10 Claims. (Cl. 244—17)

This invention relates to aircraft equipped with one or more sustaining rotors and is particularly concerned with control and trim of such aircraft.

The invention is especially adapted to a sustaining rotor having automatic means for compensating for differential lift effects at opposite sides of the rotor, especially those differential lift effects which are set up as a result of translational flight of the aircraft, during which the blade at the advancing side of the rotor experiences very much higher air speed than the blade on the retreating side. Moreover, the invention is especially adapted to an aircraft equipped with such a rotor and with flight control means operating to shift the lift line of the rotor for maneuvering.

The invention is particularly adapted to that type of sustaining rotor in which the blades are pivotally connected with the hub with freedom for movement in the "flapping" sense for automatic compensation of differential lift. Differential lift compensation, especially by automatic flapping movements of the blades during translational flight, results in a shifting of what may be termed the virtual axis of rotation of the rotor (though actually it is a shifting of the approximate axis of rotation of the blades of the rotor, without altering the location of the hub thereof). This results in movement of the rotor lift line or vector to different angular positions at different translational flight speeds. Thus, with rotors of the type having "flappingly" pivoted blades, to which the invention is particularly adapted, at high speed translational flight both the virtual axis and the lift line pass the center of gravity of the aircraft farther ahead thereof than in low speed translational flight or in vertical ascent or descent. Therefore, in different conditions of flight the virtual axis and the lift line are variously angled with respect to the physical axis of the rotor hub.

Variations in the position of the virtual axis of the rotor with respect to the physical axis of the hub causes the blades to experience greater or lesser flapping movements with respect to the hub (or equivalent differential lift compensating movements) and this in turn results in the transmission of vibrations or fluctuating loads to the pilot's control.

With the foregoing in mind, it is one of the primary objects of the present invention to provide a rotor employing differential pitch change for shifting the lift line to maneuver the craft and to tiltably mount the rotor hub so that the physical axis of the hub may be adjustably tilted into approximate coincidence with the virtual axis of the rotor and with the rotor lift line in different flight conditions. The virtual axis and the lift line ordinarily coincide or lie close to each other.

Since the major excursions of the virtual axis and the lift line take place in a fore and aft plane (as a result of variation in the differential lift effects at different flight speeds), the invention provides for tilting of the rotor hub in a fore and aft plane so that the physical axis of the hub may be swung forwardly (below the rotor) during high speed translational flight, at which time the virtual axis also swings forwardly below the rotor.

The invention also provides controllable means for periodic differential change of blade pitch and for the tilting of the hub, each of which controllable means is arranged to permit actuation thereof without appreciably altering the adjusted setting of the other.

How the foregoing and other objects and advantages are secured will appear more clearly from the following description, referring to the accompanying drawings which illustrate an embodiment of the invention as applied to an aircraft having a single sustaining rotor of the "autorotatable" type, with blades which are "flappingly" pivoted to the rotor hub.

In considering the drawings, it is to be kept in mind that the invention is applicable to various types of aircraft equipped with one or more sustaining rotors, whether or not the rotors are always autorotated. For instance, the invention is applicable to helicopters or machines in which the rotor or rotors, though perhaps autorotatable under certain conditions, are normally continuously driven; in which event, of course, provision must be made for counteracting the rotor drive torque effect. Still further the invention is applicable to sustaining rotors (whether of the helicopter or of the autorotative type) in which some means other than pure flapping pivots are employed for compensation for differential lift effects.

Referring to the drawings:

Figure 1 is a fragmentary side elevational outline view of a portion of an aircraft with a rotor hub supported thereon, the view particularly illustrating various of the controls provided in accordance with the invention;

Figure 2 is a vertical sectional view through the rotor hub and blade mounting and also through portions of the control mechanisms;

Figure 3 is a top plan view of certain parts of the rotor hub, the view being taken as indicated by the line 3—3 applied to Figure 2; and Figure 4 is an elevational view of certain parts of the control connections taken as indicated by the line 4—4 of Figure 2.

A portion of the fuselage or cabin outline appears in Figure 1 at 5, the pilot's seat being shown at 6. Connected with the fuselage framing and disposed above the cabin is a rotor support including upwardly converging pylon members 7 and 8. These members are joined by an apex member 9 to which a non-rotative hub support 10 is connected by means of a tilting pivot or fulcrum 10a.

The rotative hub 11 is of hollow cylindrical form and is journaled in the non-rotative part by bearings such as those shown at 12—12. The rotor blades are pivotally connected with the hub 11 as described hereinafter.

A portion of a rotor drive mechanism is illustrated in Figures 1 and 2. Thus, the hub 11 carries a ring gear 13 adapted to be driven by pinion 14 which is journaled in a casing 15 formed as a part of the hub support. The shafting 16 for driving the pinion desirably incorporates flexible and telescopic joints 17 and 18. At its lower end the shaft 16 is preferably connected with an engine (not shown) which, in the case of a machine equipped with an autorotatable rotor, normally serves to drive a forward propulsion airscrew to induce translational flight. In the case of the autorotatable rotor, the rotor drive mechanism just described is preferably employed only for the purpose of starting the rotor before take-off, and for this purpose such a rotor drive ordinarily incorporates both a manually operable clutch for connecting and disconnecting the drive and also a freewheeling or overrunning clutch. Suitable examples of such clutches appear in Patent No. 1,999,636 of Joseph S. Pecker, issued April 30, 1935. Moreover, in the case of an autorotatable rotor, as here shown, the rotor drive may be employed to "overspeed" the rotor to a point above its normal autorotative speed to provide for storage of kinetic energy with the rotor blade pitch reduced to zero. Upon disconnection of the rotor drive and increase of the blade pitch the kinetic energy may be converted to lift and the machine caused to effect vertical or jump take-off in the manner more fully disclosed in copending application of Juan de la Cierva, Serial No. 738,349, filed August 3, 1934, corresponding to British Patent No. 420,322.

The control and trimming mechanism of the present invention is applicable regardless of the method of take-off employed or whether the rotor is mechanically driven only in preparation for take-off or for normal flight. The invention, however, is especially useful in aircraft capable of operation over a range of conditions from vertical flight to high speed translational flight, since that type of machine experiences maximum excursions of the virtual axis of the rotor.

In the arrangement shown (see Figure 2), each of the rotor blades is connected with the hub 11 by means of three pivots. The root end or shank of a blade appears at 19 at the left in Figure 2, the same being journaled by bearings 20—20 in a sleeve 21, the bearings 20 providing a pivot for movement of the blade about its own longitudinal axis, i. e., movement in the pitch change sense. The sleeve 21 has a pair of inwardly projecting apertured lugs 22 which cooperate with one of the two pairs of pivots formed on a universal block 23, thus providing a flapping pivot axis on which the blade is free to flap in a direction generally transverse its mean rotative path of travel. The other pair of pivots 24—24 of the universal block cooperate with a pair of apertured ears 25—25 on members 26 and 27, connected to or formed integrally with the hub member 11. The pivots 24—24 provide a drag pivot axis for the blade, i. e., an axis providing freedom for blade movement fore and aft within the rotative path of travel.

The arrangement of blade mounting pivots and associated parts is not a part of the present invention per se, and is therefore only briefly described herein. For further details, reference may be made to copending application of Cyril George Pullin, Serial No. 316,330, filed January 30, 1940, issued as Patent 2,325,632 on August 3, 1943.

Change of blade pitch is secured by means of a series of connections extended within the blade mounting pivots and thence through the hub to the pilot's controls. Thus, as seen in Figure 2, a part 28 is keyed and pinned to the blade shank 19 and projects inwardly therefrom to connect with member 29 through the universal joint 30 which is centralized with respect to the point of intersection of the flapping and drag pivot axes provided by the universal joint 23. At its inner end, within the hollow hub 11, the member 29 carries an arm 31 which, as best shown in Figure 3, is curved part-way around the hub, terminating at a point approximately 90° from the axis of the associated blade. Link 32 has a spherical joint connection 32a with the free end of arm 31, the link 32 extending downwardly therefrom to connect with pin 33, this connection also taking the form of a spherical joint 32b.

It will be seen that raising and lowering of the links 32 will cause members 29 and 28 to oscillate and thereby change the blade pitch. This movement is effected by a tiltable and vertically displaceable swash member 34 on which the pins 33 are mounted, the swash member being rotatable on spindle 35. Relative rotation of the swash member 34 and hub 11 is restrained by pairs of vertical guides 32c mounted on the hub and cooperating with the eye surrounding joint 32b. The spindle 35 is mounted for universal tilting movement about intersecting axes provided by the universal joint parts 36, 37 and 38. The members 38 of this universal joint take the form of pivots which mount the universal on the sleeve 39, the lower end of which has a coarse external thread engaging a complementary internal thread formed on sleeve 40. Sleeve 40 is journaled in a non-rotative cylindrical part 41 of the hub support 10. Rotation of sleeve 39 may be prevented by any suitable means such as one or more fingers 39a engaging vertical guides 39b.

Rotation of sleeve 40 thus causes the member 39 to be raised or lowered and this, in turn, effects simultaneous increase or decrease of the average pitch of all blades of the rotor, upward movement of member 39 effecting increase of pitch and downward movement effecting decrease of pitch when the rotor rotates in a clockwise direction when viewed from above (see arrow R in Figure 3), as is contemplated in the disclosed embodiment. Rotation of the sleeve 40 is controlled by a cable 42 which engages a drum or lower extension 43 formed as a part of sleeve 40. The cable 42 may be actuated by any suitable manual control device, such as a lever or crank (not shown). This simultaneous pitch control may be employed to vary the lift or thrust of the rotor and also reduce the pitch angle of the blades to zero for purposes of driving the rotor on the ground in preparation for jump take-off in the manner above described.

As hereinbefore indicated, the present invention contemplates periodic differential pitch change of the blades to shift the lift line of the rotor for flight control or maneuvering purposes. Periodic differential pitch change is brought about by tilting the lower extension 35a (see Figure 2) of the universally mounted spindle which supports the swash member 34. The lower end of the extension 35a is reduced to provide a pin 44 to which lateral and longitudinal control connections are coupled, as will now be described.

Referring first to Figure 1, it will be seen that a control column or stick 45 is provided adjacent the pilot's seat, this stick depending from a rockshaft 46 and pivoted thereto as at 47. The rockshaft may be journaled in fixed parts 48 and 49. Longitudinal control is effected by fore and aft swinging movement of the stick 45. This movement is transmitted through link 50 having a ball connection 51 with the stick and a universal connection 52 with one arm 53 of a bellcrank pivoted on a fixed part at 54. The other arm 55 of this bellcrank is connected by a link 56 with an arm 57 of another bellcrank pivotally mounted at 58 on a fixed support 58a (see Figures 1, 2 and 4). Link 59 is connected with the last mentioned bellcrank by means of a spherical or ball joint 60 and extends therefrom toward the lower end of member 35a. The connection between member 35a and link 59 comprises a joint part having a pair of apertured fork prongs 61—61, cooperating with pin 44, and further having a pivot 62 cooperating with link 59.

By means of this linkage, fore and aft movement of the control stick 45 causes the swash member 34 to be tilted in a fore and aft plane about the axis of pivot 36.

The connections for lateral control are as follows:

Referring first to Figure 1, lateral movement of the control stick 45 causes oscillation of the rockshaft 46. This motion is converted to push-pull movement of the upright link 63 which is connected with the rockshaft 46 through a laterally projecting arm 64.

Referring to Figure 4, it will be seen that the upper end of link 63 is pivoted to an arm 65 of a bellcrank, the other arm of which is pivoted at 66 to the non-rotative hub support 10. Here, again, the bellcrank is connected with the pitch control member 35a by means of a link 67 having a ball connection 68 with the bellcrank. At its other end the link 67 is pivoted to a member 69 having a single apertured lug 70 which, as best seen in Figure 2, engages the pin 44 and lies between the pair of prongs 61—61 of the longitudinal control connection.

Lateral movement of the control stick 45 thus effects tilting movement of the swash member 34 in a lateral plane.

Tracing through the longitudinal and lateral control connections will show that forward movement of the control stick 45 (to the left when viewed as in Figure 1) causes tilting movement of the swash member downwardly at its forward edge. The converse takes place with rearward movement of the control stick.

Movement of the control stick to the pilot's left causes upward movement of the swash member 34 at the right-hand side thereof, and conversely, movement of the control stick to the pilot's right causes upward tilting movement of the swash member at the left side thereof.

With the direction of rotation of the rotor above referred to (clockwise when viewed from above) and with pitch control arms 31 for the blades extending approximately 90° around the hub, the above described movements of the control connections provide for periodic differential pitch change in the following senses:

When the control stick is moved forwardly, the blade at the advancing side of the rotor experiences its maximum decrease of pitch and the blade at the retreating side of the rotor experiences its maximum increase of pitch. This relationship is inverted when moving the control stick rearwardly.

As to lateral control, movement of the control stick to the pilot's left causes the blades to attain their maximum increase of pitch when they pass at the front of the rotor and their maximum decrease of pitch when they pass at the rear of the rotor. Control stick movement to the pilot's right produces the converse effect.

With a rotor incorporating flappingly pivoted blades, as herein illustrated, the foregoing provides "instinctive" control in pitch and roll for reasons more fully brought out in the copending application of Juan de la Cierva, Serial No. 698,372, filed November 16, 1933, corresponding to British Patent No. 410,532. In other words, the control hook-up provides a nose-down moment upon movement of the control stick forward; a nose-up moment upon movement of the control stick rearwardly; a rolling moment to the left when the stick is moved to the left; and a moment to the right with corresponding movement of the stick.

With respect to the pitch control connections above described, it is to be kept in mind that with other types of blade pivot arrangements, a somewhat different sense of control hook-up may be necessary.

As hereinbefore mentioned, operation of the aircraft in different styles of flight and especially operation at different translational flight speeds causes the virtual axis of the rotor and the rotor lift line to swing or shift with respect to the center of gravity of the craft and also with respect to the physical axis of rotation of the hub. The overcome certain disadvantages of this travel of the lift line, the present invention provides for mounting the rotor on a tilting fulcrum 10a above described, so that the physical axis of the hub may be brought to a approximately coinciding with the longitudinal position approximately coinciding with the longitudinal position of the virtual axis and of the lift line in different styles of flight.

The control means provided for this longitudinal tilting of the hub appears in Figures 1, 2 and 4. As seen in Figure 1, a crank 71 is arranged above the pilot's seat and provides for rotation of the shaft 72. The shaft rotates sprocket 73 (see Figure 2) which actuates chain 74 cooperating with another sprocket 75 mounted on a shaft 76 which is journaled in a fixed casing 77. Universal joint 78 serves to couple shaft 76 with an internally threaded sleeve 79 which cooperates with the threaded rod 80 projecting downwardly from a yoke 81 (see Figure 4). Yoke 81 is connected with the hub support 10 by the pivots 82—82.

Rotation of the hand crank 71 thus effects tilting movement of the hub about the axis of trunnion 10a and this adjustment is preferably employed as a trimming device to meet the different conditions of flight. With this in mind, the threading between members 79 and 80 is preferably irreversible, so as to maintain any desired setting.

The invention thus provides for variably shifting the physical axis of the hub to maintain approximate coincidence thereof with the virtual axis of the rotor and with the lift line. This reduces flapping movements of the blades with respect to the hub and correspondingly reduces certain vibrations or fluctuating loads which are otherwise transmitted to the pilot's controls.

Attention is called to the fact that the several control connections for simultaneous pitch change, for differential pitch change, and for tilting of the hub are all arranged so that actuation of any one does not appreciably alter the setting of either of the others. This result is achieved by the arrangement of bellcranks, links and pivots for the various operating connections as illustrated. Of particular importance in this connection is the arrangement of bellcrank 57 and the associated link 59. With this bellcrank pivoted on a fixed support and with the trunnion 10a for hub tilting located close to the horizontal plane containing the lower end of arm 35a, adjustable tilting of the hub may take place without appreciable change of blade pitch. This action may readily be appreciated from inspection of Figure 2, from which it may be seen that tilting of the hub about the trunnion 10a will not cause the pitch control arm 35a to swing to any appreciable extent, said arm being retained substantially in its adjusted angular position (in the fore and aft plane) by link 59.

The arrangement of bellcrank 65 for lateral control is also such that fore and aft tilting of the hub about the trunnion 10a will not appreciably alter the lateral pitch control adjustment.

This application is a substitute for my application Serial No. 349,049, filed August 1, 1940.

I claim:

1. In an aircraft having a bladed sustaining rotor, mechanism for shifting the lift line of the rotor to maneuver the craft including controllable means providing for periodic differential change of blade pitch, means mounting the blades on the rotor hub with freedom for movement to compensate for differential lift effects in translational flight whereby the rotor lift line moves to different positions at different translational flight speeds, and controllable means for tilting the physical axis of the rotor hub to bring said axis into approximate coincidence with the rotor lift line in different flight conditions, the first-mentioned means being constructed and arranged to accommodate rotor hub tilting without being detrimentally affected thereby.

2. In an aircraft having a bladed sustaining rotor, mechanism for shifting the lift line of the rotor to maneuver the craft including controllable means providing for periodic differential change of blade pitch, means mounting the blades on the rotor hub with freedom for movement to compensate for differential lift effects in translational flight whereby the rotor lift line moves to different positions at different translational flight speeds, and controllable means for tilting the physical axis of the rotor hub to bring said axis into approximate coincidence with the rotor lift line in different flight conditions, each of said two controllable means being actuable without appreciably altering the effective setting of the other.

3. In an aircraft having a bladed sustaining rotor, mechanism for shifting the lift line of the rotor to maneuver the craft including controllable means providing for periodic differential change of blade pitch, means mounting the blades on the rotor hub with freedom for flapping movement whereby the rotor lift line swings forwardly with respect to the center of gravity of the craft with increase in forward flight speed, and controllable means for tilting the physical axis of the rotor hub in the fore and aft sense to bring said axis into approximate coincidence with the rotor lift line in different flight conditions, the first-mentioned means being constructed and arranged to accommodate rotor hub tilting without being detrimentally affected thereby.

4. In an aircraft having a bladed sustaining rotor, mechanism for shifting the lift line of the rotor to maneuver the craft including controllable means providing for periodic differential change of blade pitch, means mounting the blades on the rotor hub with freedom for movement to compensate for differential lift effects in translational flight whereby the rotor lift line moves to different positions at different translational flight speeds, controllable means for simultaneously raising and lowering the average pitch of all blades of the rotor, and controllable means for tilting the physical axis of the rotor hub to bring said axis into approximate coincidence with the rotor lift line in different flight conditions, each of said three controllable means being actuable without appreciably altering the effective setting of either of the others.

5. In an aircraft having a sustaining rotor with flappingly pivoted blades, wherein the lift line of the rotor swings forwardly with respect to the center of gravity of the craft with increase in forward flight speed, controllable means for periodically differentially varying the rotor blade pitch angles to shift the lift line of the rotor to maneuver the aircraft, and controllable means for tilting the rotor hub, the first-mentioned means being constructed and arranged to accommodate rotor hub tilting without being detrimentally affected thereby.

6. In an aircraft having a sustaining rotor with flappingly pivoted blades, wherein the lift line of the rotor swings forwardly with respect to the center of gravity of the craft with increase in forward flight speed, controllable means for periodically differentially varying the rotor blade pitch angles to shift the lift line of the rotor to maneuver the aircraft, and controllable means for tilting the rotor hub in the longitudinal plane of symmetry of the craft, the first-mentioned means being constructed and arranged to accommodate rotor hub tilting without being detrimentally affected thereby.

7. In an aircraft, a bladed sustaining rotor having means of compensation for differential lift effects in translational flight, controllable means for effecting periodic differential change of blade pitch to shift the rotor lift line for maneuvering the craft, and adjustable means for tilting the actual rotor axis to various fixed settings to place said axis in approximate coincidence with the rotor lift line in different positions of the latter, the said controllable means being constructed and arranged to accommodate rotor axis tilting without being detrimentally affected thereby.

8. In an aircraft having a bladed sustaining rotor including a rotor axis member, a controllable pitch-changing system adapted to effect blade pitch change in synchronism with the rotational period of the rotor to control the rotor thrust line position, a pivotal mounting for tilting movement of the rotor axis member to various positions according to different flight conditions, and rotor-tilt accommodating means incorporated in the pitch changing system and adapted inherently to prevent appreciable disturbance of a given pitch control condition by the normal movements of the rotor axis member upon its pivotal mounting.

9. In an aircraft having a bladed sustaining rotor, means for shifting the lift line of the rotor to maneuver the craft including controllable means providing for periodic differential change of blade pitch, means mounting the blades on the rotor hub with freedom for movement to compensate for differential lift effects in translational flight whereby the rotor lift line moves to different positions at different translational flight speeds, and controllable means for tilting the physical axis of the rotor hub to bring said axis into approximate coincidence with the rotor lift line in different flight conditions.

10. In an aircraft having a bladed sustaining rotor incorporating means of compensation for differential lift effects in translational flight and having a rotor driving system, said rotor comprising a rotor axis member, a controllable pitch-changing system adapted to effect cyclic blade pitch change in synchronism with the rotational period of the rotor to control the rotor thrust line position, a pivotal mounting for tilting movement of the rotor axis member to various positions according to different flight conditions, rotor-tilt accommodating means incorporated in said pitch-changing system and adapted inherently to prevent appreciable detrimental disturbance of a given pitch control condition by the normal movements of the rotor axis member upon its pivotal mounting, and a blade pitch control adapted to raise and lower the mean rotor blade pitch for altering total rotor thrust under a given rotor drive condition, including control connections operative by the pilot independently of the cyclic pitch change and constructed and arranged to prevent appreciable detrimental disturbance of mean blade pitch by normal rotor axis tilting.

HAROLD F. PITCAIRN.

CERTIFICATE OF CORRECTION.

Patent No. 2,352,342. June 27, 1944.

HAROLD F. PITCAIRN.

It is hereby certified that error appears in the printed specification of the above numbered patent requiring correction as follows: Page 3, second column, line 54, for the word "The" read --To--; line 59, strike out the words "approximately coinciding with the longitudinal"; and that the said Letters Patent should be read with this correction therein that the same may conform to the record of the case in the Patent Office.

Signed and sealed this 15th day of August, A. D. 1944.

Leslie Frazer (Seal) Acting Commissioner of Patents.